(12) United States Patent
Deitmers et al.

(10) Patent No.: US 9,835,244 B2
(45) Date of Patent: Dec. 5, 2017

(54) PLANETARY GEAR TRAIN FOR A WIND POWER PLANT AND METHOD

(71) Applicant: SIEMENS AKTIENGESELLSCHAFT, München (DE)

(72) Inventors: Michael Deitmers, Stadtlohn (DE); Ralf Möllendorf, Mülheim (DE)

(73) Assignee: Siemens Aktiengesellschaft, München (DE)

( * ) Notice: Subject to any disclaimer, the term of this patent is extended or adjusted under 35 U.S.C. 154(b) by 87 days.

(21) Appl. No.: 14/917,473

(22) PCT Filed: Aug. 8, 2014

(86) PCT No.: PCT/EP2014/067108
§ 371 (c)(1),
(2) Date: Mar. 8, 2016

(87) PCT Pub. No.: WO2015/032591
PCT Pub. Date: Mar. 12, 2015

(65) Prior Publication Data
US 2016/0223073 A1   Aug. 4, 2016

(30) Foreign Application Priority Data

Sep. 9, 2013   (DE) .................. 10 2013 217 950

(51) Int. Cl.
*F16D 3/18*      (2006.01)
*F16H 57/04*    (2010.01)
(Continued)

(52) U.S. Cl.
CPC ......... *F16H 57/0486* (2013.01); *F03D 15/00* (2016.05); *F16D 3/18* (2013.01);
(Continued)

(58) Field of Classification Search
CPC ........ F03D 15/00; F16D 3/18; F16H 57/0486; F16H 57/0426; F16H 57/043
(Continued)

(56) References Cited

U.S. PATENT DOCUMENTS 2,842,945 A   7/1958   Swanson
3,174,352 A   3/1965   Jekat
(Continued)

FOREIGN PATENT DOCUMENTS

DE   85 35 076    2/1986
DE   103 02 192   9/2004
(Continued)

OTHER PUBLICATIONS

English translation of JP 2005003072 A, translationportal.epo.org, Jun. 14, 2017.*
(Continued)

*Primary Examiner* — Roger Pang
(74) *Attorney, Agent, or Firm* — Henry M. Feiereisen LLC

(57) ABSTRACT

A planetary gear train for a wind power plant includes a planetary stage rotating in a gear train housing, a spur gear stage downstream of the planetary stage, a sun wheel shaft which is non-rotatably connected to a sun wheel of the planetary gear stage, and a hollow shaft which is coaxially surrounded by a spur gear of the spur gear stage and is non-rotatably connected to the spur gear. The sun wheel shaft and the hollow shaft are non-rotatably connected to each other by a toothed coupling, with an outer toothing of the sun wheel shaft meshing with an inner toothing of the hollow shaft. The planetary gear train includes oil-guide ducts which produce a connection between an oil inlet
(Continued)

connected to the gear train housing, on the one hand, and the toothed coupling and the axial contact surface, on the other hand.

12 Claims, 3 Drawing Sheets

(51) Int. Cl.
*F16H 1/28* (2006.01)
*F03D 15/00* (2016.01)

(52) U.S. Cl.
CPC ............ *F16H 1/28* (2013.01); *F16H 1/2845* (2013.01); *F16H 57/043* (2013.01); *F16H 57/0427* (2013.01); *F05B 2260/40311* (2013.01); *F16H 57/0423* (2013.01); *Y02E 10/722* (2013.01)

(58) Field of Classification Search
USPC .......................................................... 475/159
See application file for complete search history.

(56) References Cited

U.S. PATENT DOCUMENTS

| | | | | |
|---|---|---|---|---|
| 3,518,897 A | * | 7/1970 | Bixby | ................... F16H 37/041 475/1 |
| 2017/0146113 A1 | * | 5/2017 | Iwasaki | ............... F16H 57/0479 |

FOREIGN PATENT DOCUMENTS

| | | | | |
|---|---|---|---|---|
| DE | 10 2009 031 320 | | 3/2011 | |
| DE | 10 2010 043 816 | | 5/2012 | |
| EP | 2 280 193 | | 2/2011 | |
| EP | 2 594 789 | | 5/2013 | |
| JP | 2005003072 A | * | 1/2005 | ........... F16H 57/043 |

OTHER PUBLICATIONS

International Search Report issued by the European Patent Office in International Application PCT/EP2014/067108.

\* cited by examiner

PLANETARY GEAR TRAIN FOR A WIND POWER PLANT AND METHOD

CROSS-REFERENCES TO RELATED APPLICATIONS

This application is the U.S. National Stage of International Application No. PCT/EP2014/067108, filed Aug. 8, 2014, which designated the United States and has been published as International Publication No. WO 2015/032591 and which claims the priority of German Patent Application, Serial No. 10 2013 217 950.2, filed Sep. 9, 2013, pursuant to 35 U.S.C. 119(a)-(d).

BACKGROUND OF THE INVENTION

The invention relates to a planetary gear train for a wind power plant.

EP 2594789 A1 (Winergy AG) 22 May 2013 describes a lubricant supply to a toothed coupling of a wind turbine gear train. Here a lubricant feed nozzle sprays lubricant onto a conical through-flow opening of a lubricant feed ring. By extending the lubricant feed ring in the direction of the toothed coupling, injected lubricant is forwarded in the direction of the toothed coupling.

Wind turbine gear trains can comprise spline shaft connections and thrust bearing surfaces, which are disposed within two rotating components. The adequate supply of such metal-metal contacts with lubricant is important in order to prevent wear. The purely indirect accessibility of the lubricate locations and the centrifugal force effect caused by the rotation of the components renders an adequate lubricant supply by means of an oil thrower or oil spraying facility difficult. In practice, with an open jet injection of the lubricate locations, this results in significant lubricant losses, so that only a small part of the lubricant reaches the lubricate locations. The supply of lubricant to the lubricate locations is thus significantly impaired.

SUMMARY OF THE INVENTION

The object thus underlying the present invention is to ensure an improved lubricant supply in a wind turbine gear train.

This object is achieved in accordance with the invention by a planetary gear train for a wind power plant including a drive side planetary stage rotating in a gear train housing, an output side spur gear stage arranged downstream of the planetary stage, a sun wheel shaft which is non-rotatably connected to a sun wheel of the planetary stage and a hollow shaft, which is coaxially surrounded by a spur gear of the spur gear stage and is non-rotatably connected to said spur gear. The sun wheel shaft and the hollow shaft are non-rotatably connected to one another by a toothed coupling, in which an outer toothing of the sun wheel shaft meshes with an inner toothing of the hollow shaft. The sun wheel shaft and the hollow shaft abut one another in the region of an axial contact surface. The gear train has oil feed ducts, which establish a connection between an oil inlet connected with the gear train housing on the one hand and the toothed coupling and the axial contact surface on the other hand in order to pressure lubricate the toothed coupling and the axial contact surface. The wind gear train can also comprise more than two planetary stages. It is also possible for the wind gear train to comprise a number of axial contact surfaces, wherein in accordance with the invention oil can be fed to at least one axial contact surface by way of oil feed ducts.

The terms "lubricant" and "oil" are used synonymously in the description. The use of the term "oil" thus comprises all suitable lubricants.

The invention is based on the knowledge that contrary to an oil thrower or oil spraying lubrication, by means of a pressure lubrication via oil feed ducts, lubricant can also be brought in a reliable manner to lubricate locations on rapidly rotating shafts which are only accessible with difficulty, e.g. because they are only indirectly accessible. On account of the typical rotational speeds of the shafts, sun wheel shaft and hollow shaft, which mesh with one another, in the region of 450 rpm, there is the risk, namely with a free jet injection, that the oil is centrifuged by the centrifugal force of the components before reaching the lubricate location. With a pressure lubrication, preferably with an oil pressure of at least approx. 1 to 1.5 bar above atmospheric pressure, oil can be reliably routed to the locations to be lubricated despite the active centrifugal forces. Typical oil pressures for the pressure lubrication lie at approx. 1 to 2 bar, in particular at 1.5 to 2 bar.

The invention solves the problem of significant lubricant losses, which occurs with the previously realized oil thrower or oil spraying lubrication of the toothed coupling by free jet feed. Instead of the oil thrower or oil spraying lubrication, a compressed oil supply to the lubricate locations is provided in accordance with the invention by way of a rotary feedthrough for the lubricant. This achieves a significant reduction in the losses occurring during free jet lubrication.

A further advantage of the new type of feed of lubricant to the lubricate locations is that a flow direction is enforced. This means that wear debris can be removed from the contact zone of the components and can no longer be damaging.

In gear trains, axial contact surfaces can be provided in order to transmit axial forces from a first component to a second component. One example of a component pair of this type is a sun wheel shaft of a planetary stage and a hollow shaft of a spur gear stage in a gear train for a wind power plant. Here an annular contact surface of the sun wheel shaft is disposed on a corresponding contact surface of the hollow shaft. One technical problem consists in the occurrence of wear at the axial contact surfaces of abutting components. The wear causes the risk of toothing or bearing damage either directly as a result of a wear-specific displacement of the components relative to one another or indirectly as a result of an emission of wear debris. This wear is reduced by a reliable lubrication of the contact surface, such as can be realized with the present invention.

Advantageous embodiments and developments of the invention are set out in the dependent claims.

According to an advantageous development of the invention, the planetary gear train comprises a first axial oil feed duct, which is formed by an annular cavity extending between the hollow shaft and the sun wheel shaft, and/or a second axial oil feed duct, which is guided axially through the hollow shaft, as well as a radial oil feed duct, which runs radially through a ring molded to the hollow shaft and at the one end is connected to the oil inlet and at the other end to the first and/or the second axial oil feed duct.

According to an advantageous development of the invention, the planetary gear train comprises a planetary gear stage rotating in a gear train housing, a spur gear stage downstream of the planetary stage, a sun wheel shaft which is non-rotatably connected to a sun wheel of the planetary gear stage and a hollow shaft. The hollow shaft is coaxially surrounded by a spur gear of the spur gear stage and is non-rotatably connected to said spur gear. The sun wheel shaft and the hollow shaft are non-rotatably connected to one another by a toothed coupling. The toothed coupling is formed by an outer toothing of the sun wheel shaft and an inner toothing of the hollow shaft, which mesh with one another. The toothed coupling is arranged in an axial section of the gear train, in which the sun wheel shaft is surrounded by the hollow shaft. The gear train further comprises a first axial oil feed duct running between the hollow shaft and the sun wheel shaft and leading to the toothed coupling and a rotary transmission apparatus, which is suited to transmitting oil from an oil inlet connected to the gear train housing to the first oil feed duct.

According to an advantageous development of the invention, the gear train comprises a rotary transmission apparatus, which is suited to transmitting oil from the oil inlet to the oil feed ducts.

According to an advantageous development of the invention, the rotary transmission apparatus comprises an annular groove cut into a ring molded to the hollow shaft, into which annular groove the oil inlet flows and which is connected to the oil feed ducts.

Alternatively, the ring comprising the annular groove can also be embodied as a separate installation ring or lubricant feed ring, instead of being molded in one piece with the hollow shaft. Here the installation ring can be stationary relative to the hollow shaft or rotate with a different rpm. It is also possible for the installation ring to be connected to the hollow shaft. Furthermore, the installation ring can have an oil feed duct, which is connected at a first end to an oil inlet fed through a wall of the gear train housing, said oil inlet being connected to an oil delivery pump. The oil feed duct is connected at a second end to an axial oil feed duct, if necessary in turn by way of an annular groove.

According to an advantageous development of the invention, the rotary transmission apparatus for lubricant comprises an annular groove, which is cut into a ring molded to the hollow shaft. The oil inlet fed through the gear train housing preferably flows into this annular groove. The rotary transmission apparatus for lubricant also comprises at least one oil feed duct, which extends radially through the ring and thus forms a connection between the annular groove and at least one of the axial oil feed ducts.

According to an advantageous development of the invention, the toothed coupling is arranged in an axial section of the gear train, in which the hollow shaft surrounds the sun wheel shaft.

According to an advantageous development of the invention, the drive side end of the first axial oil feed duct is sealed by an annular seal arranged between the sun wheel shaft and the hollow shaft. The seal can be embodied as a physical seal, e.g. an O-ring, or a contact-free seal of the two components, e.g. a labyrinth seal. The O-ring can be inserted here into an annular groove of the hollow shaft or the sun wheel shaft. The seal between the two components, sun wheel shaft and hollow shaft, relative to one another means that lubricant can no longer get lost in the direction of the toothed coupling, i.e. can escape out of the first axial oil feed duct. The flow through the toothed coupling and if necessary furthermore the axial thrust bearing surface will become even stronger and more low-loss.

According to an advantageous development of the invention, an annular cavity extending between the sun wheel shaft and the hollow cavity connects to the end of the toothed coupling facing away from the first axial oil feed duct. The cavity is connected on one side to the axial contact surface of the sun wheel shaft and the hollow shaft, and on the other side by the toothed coupling to the first axial oil feed duct. The oil routed via the first axial oil feed duct of the toothed coupling can thus reach the axial contact surface of the sun wheel shaft and the hollow shaft after passing through the coupling via the cavity in a lubricating fashion and thus provides for a wear-reducing lubrication.

According to an advantageous development of the invention, the sun wheel shaft comprises an annular bulge, which interacts with the ring of the hollow shaft, in order to form an end of the first axial oil feed duct. The annular bulge is not disposed here on the ring of the hollow shaft, but a gap, which can preferably be sealed by a physical or contact-free seal preferably remains. Since the annular bulge already largely tapers the cross-section of the first axial oil feed duct, the fully closing seal can be embodied smaller. Closing the first axial oil feed duct at its end facing away from the toothed coupling means that lubricant can no longer get lost in the direction of the toothed coupling, i.e. can escape out of the first axial oil feed duct. The flow through the toothed coupling and if necessary furthermore the axial thrust bearing surface will become even stronger and more low-loss.

According to an advantageous development of the invention, the oil inlet is connected to an oil delivery pump. As a result, a pressure lubrication of the lubricate locations can be observed under a predetermined pressure.

The object is also achieved by a method for lubricating a planetary gear train for a wind power plant, wherein the planetary gear train comprises a drive side planetary gear stage rotating in a gear train housing, an output side spur gear stage downstream of the planetary stage, a sun wheel shaft which is non-rotatably connected to a sun wheel of the planetary gear stage and a hollow shaft, which is coaxially surrounded by a spur gear of the spur gear stage, and is non-rotatably connected to said spur gear, wherein the sun wheel shaft and the hollow shaft are non-rotatably connected to one another by a toothed coupling, in which an outer toothing of the sun wheel shaft meshes with an inner toothing of the hollow shaft and abut one another in the region of an axial contact surface, wherein oil is routed with pressure through oil feed ducts, which establish a connection between an oil inlet connected to the gear train housing on the one hand and the toothed coupling and the axial contact surface on the other hand, to the coupling and the axial contact surface.

It is preferable if the oil is transported to the toothed coupling and the axial contact surface at a pressure of at least approx. 1 to 1.5 bar above atmospheric pressure. Typical oil pressures for the pressure lubrication lie at approx. 1 to 2 bar, in particular at 1.5 to 2 bar. Leakage losses possibly occurring due to the relatively high oil pressure, in particular at main access points for oil between rotating and non-rotating components, are accepted or balanced out by a correspondingly higher oil volume flow.

It is advantageous if the oil routed through the oil feed ducts reaches and lubricates the toothed coupling prior to and/or after reaching the axial contact surface.

BRIEF DESCRIPTION OF THE DRAWING

The present invention is explained in more detail below in an exemplary embodiment on the basis of the drawings, in which.

DETAILED DESCRIPTION OF PREFERRED EMBODIMENTS

Figure 1:
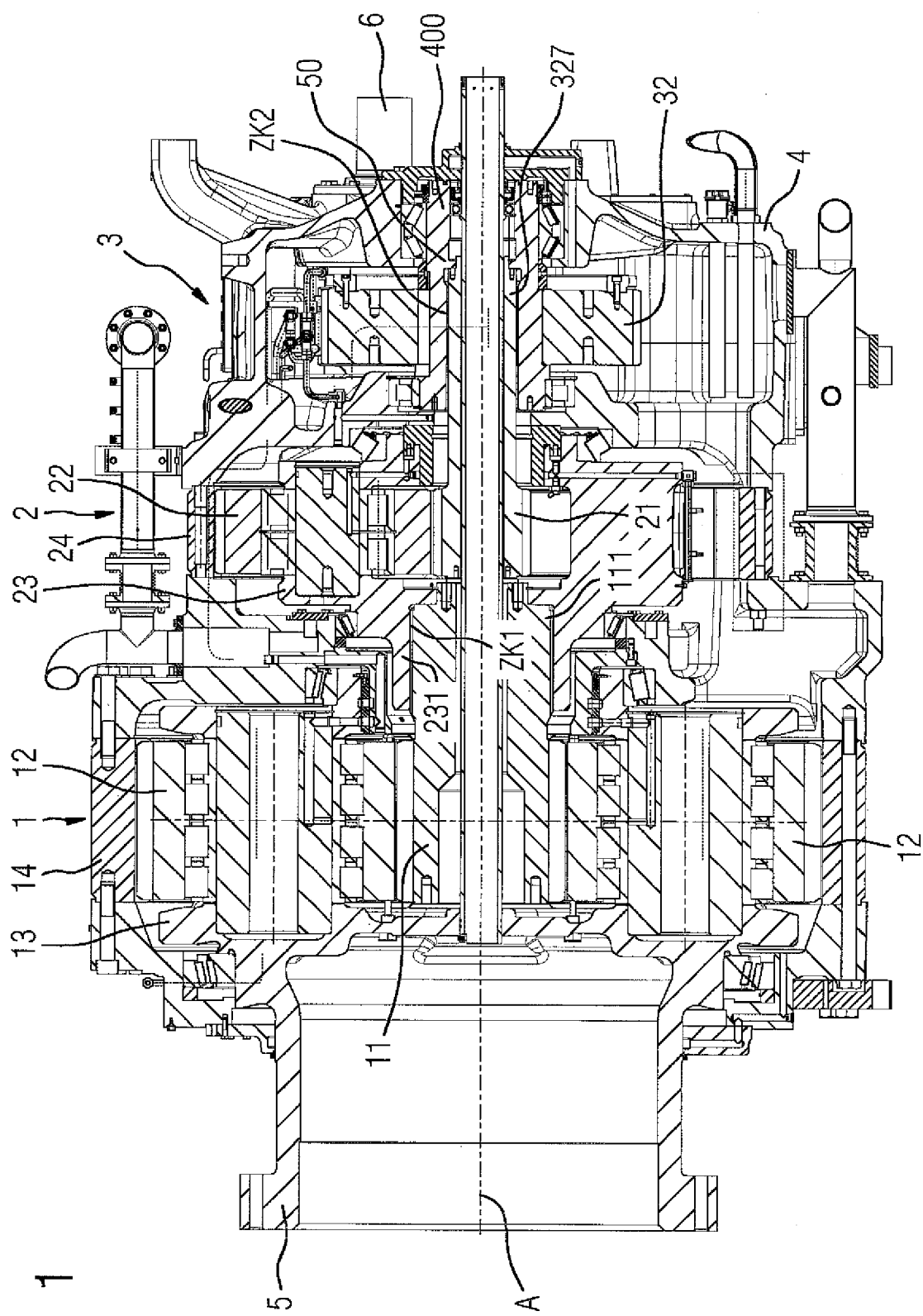
FIG. 1 shows a cross-sectional representation of a three-stage gear train for a wind power plant.

FIG. 1 represents a gear train, which comprises a drive side first planetary stage 1, an output side second planetary stage 2 arranged downstream of the first planetary stage 1 and a drive side spur wheel stage 3, which are surrounded by a gear train housing 4. A drive shaft 5 which can be connected to a rotor hub and an output shaft 6 which can be connected to a generator are supported in the gear train housing 4. The drive shaft 5 is connected to a planetary carrier 13 of the drive-side planetary stage 1, while the output shaft 6 is connected to a front tooth coupling (not shown) of the output-side spur gear stage 3.

The two planetary stages 1, 2 each comprise a hollow wheel 14, 24, a number of planetary wheels 12, 22 supported in a planetary carrier 13, 23 and a sun wheel 11, 21. The drive shaft 5 is molded here in one piece to the planetary carrier 13 of the drive side planetary stage 1. A sun wheel shaft 111 non-rotatably connected to the sun wheel 11 of the drive side planetary stage 1 is connected to the planetary carrier 23 of the second planetary stage 2 by way of a short toothed coupling ZK1. A hollow shaft 231 is molded in one piece to the planetary carrier 23 of the second planetary stage 2, said hollow shaft 231 concentrically surrounding an end section of the sun wheel shaft 111 of the drive side planetary stage 1. The short toothed coupling ZK1 between the two planetary stages 1, 2 is formed here by an outer toothing on the sun wheel shaft 111 of the drive side planetary stage 1 and by an inner toothing on the hollow shaft 231 on the planetary carrier 23 of the second planetary stage 2.

The spur gear stage 3 comprises, aside from the front toothed coupling, a spur gear 32 mating herewith and a hollow shaft 400, which is surrounded by the spur wheel 32 coaxially relative to the gear train axis A and is non-rotatably connected herewith. A sun wheel shaft 327 which is non-rotatably connected to the sun wheel 21 of the second planetary stage 2 is connected to the hollow shaft 400 of the spur gear stage 3 by way of a short toothed coupling ZK2, which surrounds an end section of the sun wheel shaft 327 coaxially relative to the gear train axis A. The short toothed coupling ZK2 between the second planetary stage 2 and the spur gear stage 3 is formed here by an outer toothing on the sun wheel shaft 327 of the second planetary stage 2 and by an inner toothing on the hollow shaft 400 of the spur gear stage 3. To keep the wear of the toothed coupling ZK2 to a minimum, this is to be lubricated.

Axial forces acting on the sun wheel shaft 327, produced inter alia by helical toothing of the sun wheel 21 and the planetary wheels 22 of the second planetary stage 2 mating with the sun wheel 21, push the sun wheel 327 against the hollow shaft 400 of the spur gear stage 3. Here the sun wheel shaft 327 and the hollow shaft 400 touch corresponding axial contact surfaces 50, the so-called axial contact surfaces. To keep the wear of the axial contact surfaces 50 to a minimum, these should be lubricated.

Figure 2:
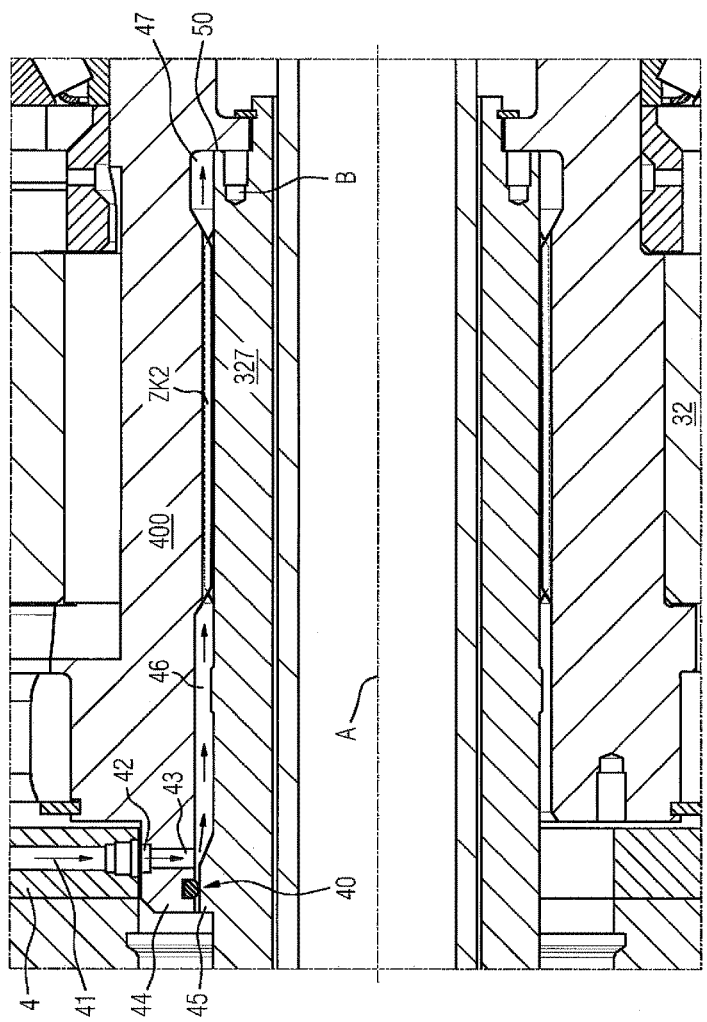
FIG. 2 shows a first exemplary embodiment in an enlarged representation in FIG. 1.

FIG. 2 shows greater detail from FIG. 1, namely the sun wheel shaft 327 of the second planetary stage and the hollow shaft 400 of the spur gear stage in the region of the toothed coupling ZK2 and the axial contact surface 50 connecting these two components. The bores B in the front surface of the sun wheel shaft 327 serve to handle the components during manufacture.

An oil inlet 41 is connected to the gear train housing 4. The oil inlet 41 is connected to an oil delivery pump, so that oil can be transported at a predefined pressure through the oil inlet 41. The oil inlet 41 flows into an annular groove 42, which is molded to the outer periphery of a ring 44, which is embodied at the rotor-side end of the hollow shaft 400. One or a number of radial oil guide ducts 43 through which oil can be routed in the direction of the sun wheel shaft 327 discharges from the annular groove 42 in the radial direction.

The end of the radial oil guide ducts 43 facing toward the sun wheel shaft 327 opens into a first axial oil guide duct 46. The rotor-side end of the duct 46 is blocked by an annular bulge 45 on the outer periphery of the sun wheel shaft 327, which extends to the inner periphery of the ring 44 of the hollow shaft 400. A sealing ring 40 is arranged in an annular groove between the bulge 45 of the sun wheel shaft 327 and the ring 44 of the hollow shaft 400 in order to completely seal the rotor-side end of the first axial oil feed duct 46 in a fluid-tight manner.

The first axial oil feed duct 46 in the form of a hollow cylinder between the sun wheel shaft 327 and the hollow shaft 400 proceeds toward the second toothed coupling ZK2. The first axial oil feed duct 46 is therefore automatically formed in an axial section of the gear train, in which the hollow shaft 400 surrounds the sun wheel shaft 327. The toothed coupling ZK2 connects to the output side end of the first axial oil feed duct 46. An annular cavity 47, which, like the first axial oil feed duct 46, is automatically formed in an axial section of the gear train, in which the cavity 400 surrounds the sun wheel shaft 327, connects to the output side end of the toothed coupling ZK2. The axial contact surface 50, along which the sun wheel shaft 327 and the hollow shaft 400 abut one another, is disposed at the output side end of the cavity 47.

During operation of the planetary gear train, the components, sun wheel shaft 327 and hollow shaft 400, non-rotatably coupled to one another by means of the toothed coupling ZK2, rotate with one another about the gear train axis A, e.g. at a rotational speed in the region of 470 rpm. Oil is pumped into the annular groove 42 of the rotating hollow shaft 400 from the oil inlet 41, which is connected to the non-rotating gear train housing 4. The developing flow direction of the oil is specified in FIG. 2 by arrows. On account of the oil pressure, the oil can be transported counter to the centrifugal force effected on the oil by the rotation of the hollow shaft 400 through the radial oil feed duct 43 to the first axial oil feed duct 46. The fluid-tight closure of the drive side end of the first axial oil feed duct 46 forces the oil to flow exclusively in the desired flow direction. Oil thus flows through the toothed coupling ZK2, the cavity 47 and the axial contact surface 50 one after the other. After leaving the axial contact surface 50, oil flows into an oil sump of the gear train.

This produces a reliable and continual flow of lubricant, namely in the form of a pressure lubrication, the toothed coupling ZK2 between the sun wheel shaft 327 of the second planetary gear stage 2 and the hollow shaft 400 of the spur gear stage 3 coaxially surrounded by the spur gear 32 of the spur gear stage 3 and the axial contact surface 50. The forced flow in a predetermined direction causes the wear debris to be removed from the contact zone of the components and to no longer be able to be damaging.

Figure 3:
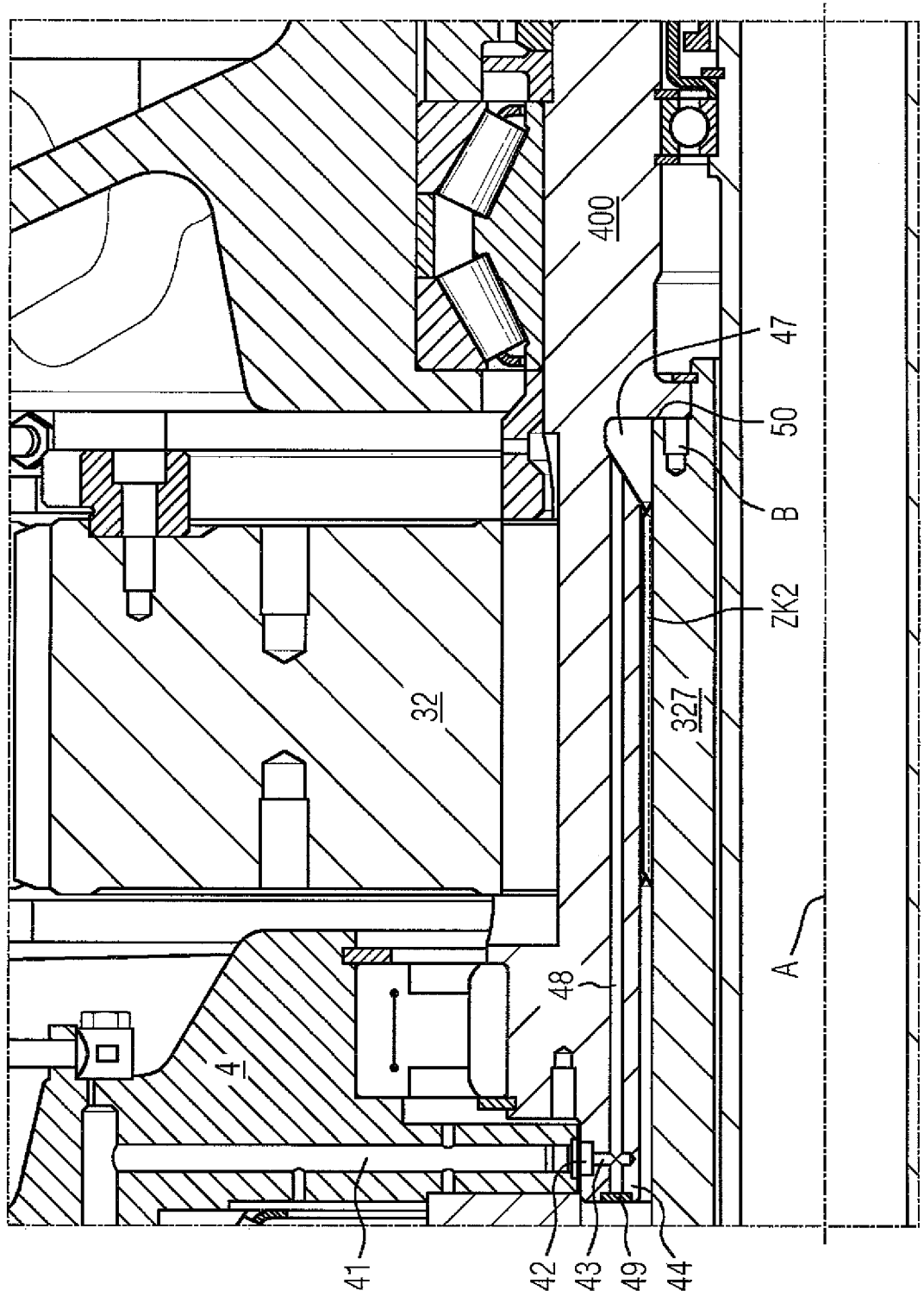
FIG. 3 shows a further exemplary embodiment in an enlarged representation in FIG. 1.

FIG. 3 shows the same components as in FIG. 2, but according to an alternative embodiment of the invention. Reference is therefore made to the afore-cited explanations relating to FIG. 2, wherein the following differences exist:

instead of the first axial oil feed duct 46, in this embodiment the hollow shaft 400 has a second axial oil feed duct 48, which penetrates the hollow shaft in parallel to the gear train axis A. The radial oil duct 43 passing radially through the ring 44 is embodied as a blind hole, but is however axially 44 connected to the second axial oil feed duct 48. At the one end, the second oil feed duct 48 runs up to a front face of the ring, at the other end it flows into the cavity 47. Since the opening arranged on the front face of the ring 44 was closed again after manufacturing the duct 48, e.g. by means of a closing plug 49, oil fed via the radial oil duct 43 can only flow through the second axial oil feed duct 48 in one direction. This oil thus firstly reaches the cavity 47. From there part of the oil can flow to the axial contact surface 50, the remaining part can flow out of the cavity 47 to the toothed coupling ZK2.

Although the invention was illustrated and described in detail by the preferred exemplary embodiments, the invention is not restricted by the disclosed examples.

What is claimed is:

1. A planetary gear train for a wind power plant, comprising:
    a gear train housing having an oil inlet;
    a drive side planetary stage configured for rotation in the gear train housing and including a sun wheel;
    an output side spur gear stage disposed downstream of the planetary stage and including a spur gear;
    a sun wheel shaft connected in fixed rotative engagement to the sun wheel of the drive side planetary stage and including an outer toothing;
    a hollow shaft coaxially surrounded by the spur gear of the spur gear stage and connected in fixed rotative engagement to the spur gear, said hollow shaft including an inner toothing in mesh with the outer toothing of the sun wheel shaft so as to form a toothed coupling by which the sun wheel shaft and the hollow shaft are connected to one another in fixed rotative engagement, the sun wheel shaft and the hollow shaft abutting one another to define an axial contact surface; and
    oil feed ducts establishing a connection between the oil inlet of the gear train housing, on the one hand, and the toothed coupling and the axial contact surface, on the other hand, for pressure lubrication of the toothed coupling and the axial contact surface.

2. The planetary gear train of claim 1, further comprising a ring formed on the hollow shaft, said oil feed ducts comprising at least one member selected from the group consisting of a first axial oil feed duct formed by an annular cavity which extends between the hollow shaft and the sun wheel shaft, and a second axial oil feed duct sized to extend axially through the hollow shaft, and a radial oil feed duct sized to extend radially through the ring and defining one end connected to the oil inlet and another end connected to the member.

3. The planetary gear train of claim 1, further comprising a rotary transmission apparatus configured to transmit oil from the oil inlet to the oil feed ducts.

4. The planetary gear train of claim 3, further comprising a ring formed on the hollow shaft, said rotary transmission apparatus comprising an annular groove cut into the ring and connected to the oil feed ducts, said oil inlet feeding into the annular groove.

5. The planetary gear train of claim 1, wherein the hollow shaft extends in surrounding relationship to the sun wheel shaft along an axial section in which the toothed coupling is arranged.

6. The planetary gear train of claim 2, further comprising an annular seal arranged between the sun wheel shaft and the hollow shaft, said first axial oil feed duct having a drive side end which is sealed by the annular seal.

7. The planetary gear train of claim 2, wherein the second axial oil feed duct has a drive side end which is sealed.

8. The planetary gear train of claim 7, wherein the drive side end of the second axial oil feed duct is embodied as a continuous bore having a drive side opening, and further comprising a closing plug configured to close the drive side opening.

9. The planetary gear train of claim 1, wherein the oil inlet is connected to an oil delivery pump.

10. A method for lubricating a planetary gear train for a wind power plant, said planetary gear train including a gear train housing having an oil inlet, a drive side planetary stage configured for rotation in the gear train housing and including a sun wheel, an output side spur gear stage disposed downstream of the planetary stage and including a spur gear, a sun wheel shaft connected in fixed rotative engagement to the sun wheel of the drive side planetary stage and including an outer toothing, a hollow shaft coaxially surrounded by the spur gear of the spur gear stage and connected in fixed rotative engagement to the spur gear, said hollow shaft including an inner toothing in mesh with the outer toothing of the sun wheel shaft so as to form a toothed coupling by which the sun wheel shaft and the hollow shaft are connected to one another in fixed rotative engagement, the sun wheel shaft and the hollow shaft abutting one another to define an axial contact surface, said method comprising:
    routing oil under pressure through oil feed ducts to establish a connection between the oil inlet of the gear train housing, on the one hand, and the toothed coupling and the axial contact surface, on the other hand, for pressure lubrication of the toothed coupling and the axial contact surface.

11. The method of claim 10, wherein the oil routed through the oil feed ducts is fed to the toothed coupling prior to and/or after reaching the axial contact surface.

12. The method of claim 10, wherein the oil is transported to the toothed coupling and the axial contact surface at a pressure of at least approx. 1 to 1.5 bar above atmospheric pressure.

* * * * *